US008240803B2

(12) United States Patent
Ushigome (10) Patent No.: US 8,240,803 B2
(45) Date of Patent: Aug. 14, 2012

(54) RECORDING APPARATUS AND METHOD FOR CONTROLLING THE RECORDING APPARATUS

(75) Inventor: Yosuke Ushigome, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/892,602

(22) Filed: Sep. 28, 2010

(65) Prior Publication Data

US 2011/0018924 A1    Jan. 27, 2011

Related U.S. Application Data

(63) Continuation of application No. 12/257,274, filed on Oct. 23, 2008, now Pat. No. 7,823,999.

(30) Foreign Application Priority Data

Oct. 25, 2007   (JP) .................................. 2007-278053

(51) Int. Cl.
B41J 29/38    (2006.01)
(52) U.S. Cl. ................................ 347/14; 347/15; 347/43
(58) Field of Classification Search ................ 347/5, 14, 347/15, 19, 20, 23, 40, 41, 43, 54
See application file for complete search history.

(56) References Cited

U.S. PATENT DOCUMENTS 6,629,743 B2 *  10/2003  Chikuma et al. ................. 347/15

FOREIGN PATENT DOCUMENTS

JP    2006-168099 A    6/2006

* cited by examiner

Primary Examiner — Thinh Nguyen
(74) Attorney, Agent, or Firm — Canon U.S.A., Inc. IP Division (57) ABSTRACT

A recording apparatus includes a recording head configured to scan a recording medium and record an image on the recording medium. The recording apparatus includes a recording buffer to store image data representing one pixel with a plurality of bits, a reading unit to read, from a storage area of the recording buffer, image data corresponding to a region including a boundary between two regions recorded on the recording medium in successive scanning and recording operations, a thinning unit to thin out image data based on a thinning rate corresponding to the image data read by the reading unit, a storage unit to store image data thinned out by the thinning unit in the storage area of the recording buffer, a quantization unit to perform quantization processing on the image data stored in the recording buffer when the image data is transferred to the recording head, and a recording unit to perform recording based on the image data quantized by the quantization unit.

17 Claims, 8 Drawing Sheets

RECORDING APPARATUS AND METHOD FOR CONTROLLING THE RECORDING APPARATUS

CROSS REFERENCE OF RELATED APPLICATIONS

This application is continuation of U.S. patent application Ser. No. 12/257,274 filed Oct. 23, 2008 which claims priority from Japanese Patent Application No. 2007-278053 filed Oct. 25, 2007, which are hereby incorporated by reference herein in their entirety.

BACKGROUND OF THE INVENTION

1. Field of the Invention

The present invention relates to a recording apparatus including a recording head configured to perform scanning to form an image on a recording medium, and a method for controlling the recording apparatus.

2. Description of the Related Art

Recent inkjet recording apparatuses are required to perform high-speed recording on a recording medium. To realize high-speed recording, it is effective to reduce a number of passes in multi-pass recording that can realize high-quality recording. The "number of passes" represents times of scanning performed by a recording head to complete recording of a recording region corresponding to one band.

The multi-pass recording includes scanning a recording head and feeding a paper (recording medium), which are repetitively performed. The number of discharge ports provided on the recording head is constant. Therefore, reducing the number of passes can increase a paper feeding amount per feeding operation. For example, if a recording apparatus performs one-pass recording, the paper feeding amount per feeding operation is doubled compared to two-pass recording. As a result, recording speed of the recording apparatus can be doubled.

More specifically, if the number of passes decreases, the times of scanning performed by the recording head to complete recording of a predetermined recording region decrease. When the paper feeding amount per feeding operation increases, time required for completing the recording of the predetermined recording region becomes shorter.

A general inkjet recording apparatus is equipped with a recording head including a plurality of discharge ports capable of discharging ink droplets which performs scanning in a direction perpendicular to an alignment direction of the discharge ports to perform recording. Therefore, if the inkjet recording apparatus performs one-pass recording, the inkjet recording apparatus can complete recording of a band-like recording region corresponding to one band during one recording/scanning operation.

In this manner, when a recording apparatus performs one-pass recording, the recording apparatus completes recording of a recording region corresponding to one band during only one recording/scanning operation. An amount of ink discharged to a recording medium per recording/scanning operation is greater than that required for multi-pass recording that performs recording/scanning two times or more to complete recording of the recording region corresponding to one band. Therefore, when the recording apparatus performs one-pass recording, a portion having a higher image density than other portions (a black streak) may appear in a boundary portion between two recording regions formed in consecutive recording/scanning operations, if the recording regions have higher ink densities, although the degree of the black streak is variable depending on the type of the recording medium or ink(s).

Generation of a black streak tends to appear in a recording operation by an inkjet recording apparatus equipped with a plurality of recording heads each of which discharges different ink (yellow (Y), magenta (M), cyan (C), etc.) arrayed in a scanning direction thereof. The black streak can be referred to as "boundary streak." Generation of boundary streak (s) may decrease recording quality to below an acceptable level.

As discussed in Japanese Patent Application Laid-Open No. 2002-96460, there is a conventional one-pass recording method capable of recording a high-quality image while reducing boundary streaks. The method includes determining values of hue and chroma in a target region of a boundary portion between consecutive bands based on ink discharge amounts. The method further includes setting a thinning rank for each ink and a recording position based on the determined values of hue and chroma, and performing recording while thinning out some data based on the thinning rank. As a result, boundary streaks appearing between consecutive bands can be reduced when a recording apparatus performs one-pass recording.

The above-described method for reducing boundary streaks basically includes inputting binary data (e.g., bitmap data) of Y, M, and C, or multi-valued data of red (R), green (G), and blue (B), from a host apparatus. If the input data is bitmap data of Y, M, and C, the method includes counting ink dots discharged for respective colors, setting a thinning rank for each color considering magnitude correlation of counted values of respective colors, and performing thinning processing with a mask pattern corresponding to the set rank.

If the input data is multi-valued data of R, G, and B, the method includes multiplying the input data by reducing coefficients (table values) to perform thinning processing in the process of converting the input data into corresponding Y, M, and C data. However, from the viewpoint of saving the memory capacity of the recording apparatus or reducing the number of gates provided in an application specific integrated circuit (ASIC), it is desirable that the data received from the host apparatus is density data of respective colors corresponding to ink colors in an image region with a predetermined size. Reasons for that are as follows.

To save the memory capacity, compression of data is effective. The above-described density data of each color is compressed data. A recording buffer can store a greater amount of information if the data is compressed. The amount of information usable for a calculation can be increased. Compression of data is a key to realization of high-quality recording and high-speed recording.

To reduce the number of gates of a central processing unit (CPU), it is desired that the input data received from the host apparatus can be easily converted into recordable data for a recording head with minimum processing. To this end, it is ideal that the host apparatus performs color conversion from R, G, B to Y, M, C or other processing placing a heavy load on the CPU, while the recording apparatus performs only processing that contributes to the high-quality recording and the high-speed recording. The processing contributing to the high-quality recording and the high-speed recording is, for example, processing necessary for executing multi-pass recording or image processing applied to the boundary portion between consecutive bands. Therefore, to perform this processing, the recording buffer should store recorded data corresponding to at least one band.

For the above-described reasons, it is desired that the data received from the host apparatus is desirably the density data of respective colors corresponding to ink colors in the image region with the predetermined size. However, the above-described conventional inkjet recording apparatus can process only bitmap data and multi-valued R, G, B data, and can not process density data of respective colors.

Further, according to the above-described conventional techniques, thinning processing applied to bitmap data (binary data) and color conversion from R, G, B to Y, M, C require different color gamut determination algorithms. Furthermore, the boundary portion between consecutive bands cannot be directly detected from R, G, and B data. It is therefore necessary to additionally input information relating to the boundary portion between consecutive bands from the host apparatus.

SUMMARY OF THE INVENTION

An exemplary embodiment of the present invention is directed to a recording apparatus configured to input density data of an image region with a predetermined image size for each color from a host apparatus to save a memory capacity and reduce a circuit scale of a control circuit and can reduce a boundary streak appearing in a boundary portion between neighboring bands.

According to an aspect of the present invention, a recording apparatus has a recording head configured to perform scanning of a recording medium and record an image on the recording medium. The recording apparatus includes a recording buffer configured to store image data representing one pixel having a plurality of bits, a reading unit configured to read, from a storage area of the recording buffer, image data corresponding to a region including a boundary between a region recorded on the recording medium by a first scanning and recording operation and a region recorded on the recording medium by a subsequent scanning and recording operation, a thinning unit configured to thin out the image data based on a thinning rate corresponding to an ink amount indicated by the image data read by the reading unit, a storage unit configured to store the image data thinned out by the thinning unit in the storage area of the recording buffer, and a recording unit including the recording head configured to perform recording based on the image data including the thinned out data.

Further features and aspects of the present invention will become apparent from the following detailed description of an exemplary embodiment with reference to the attached drawings.

BRIEF DESCRIPTION OF THE DRAWINGS

The accompanying drawings, which are incorporated in and constitute a part of the specification, illustrate an exemplary embodiment and features of the invention and, together with the description, serve to explain at least some of the principles of the invention.

DETAILED DESCRIPTION OF THE EMBODIMENTS

The following description of an exemplary embodiment is illustrative in nature and is in no way intended to limit the invention, its application, or uses. It is noted that throughout the specification, similar reference numerals and letters refer to similar items in the following figures, and thus once an item is described in one figure, it may not be discussed for following figures. The exemplary embodiment of the present invention will now be described in detail with reference to the drawings.

In the following description, "recording" (or "print") should be broadly understood as a term indicating not only formation of meaningful information (text, graphics, etc.), but also formation of images, designs, and patterns on a recording medium, and processing on a medium regardless of whether it is meaningful or not. A recorded (or printed) output is not limited to a visible one and includes a non-visible one.

A "recording medium" according to the exemplary embodiment broadly includes papers usable in general recording apparatuses and other materials which can accept ink (e.g., cloths, plastic films, metallic plates, glass, ceramics, woods, and leathers).

Similarly, "ink" should be broadly understood as a term indicating a liquid material capable of forming images, designs, and patterns when applied on a recording medium or processing of ink for a recording medium. For example, "processing of ink" includes solidification or precipitation of a coloring material in ink applied to a recording medium.

An example recording apparatus according to the exemplary embodiment of the present invention is a serial printer equipped with a plurality of recording heads. In the present exemplary embodiment, the recording apparatus receives index data of each color, which is density data corresponding to an image region with a predetermined size, transmitted from a personal computer (PC), serving as a host apparatus. The recording apparatus performs thinning processing on the index data stored in a recording buffer without converting the index data into bitmap data, and performs binarization processing on the data to be transferred to a recording head.

Figure 6:
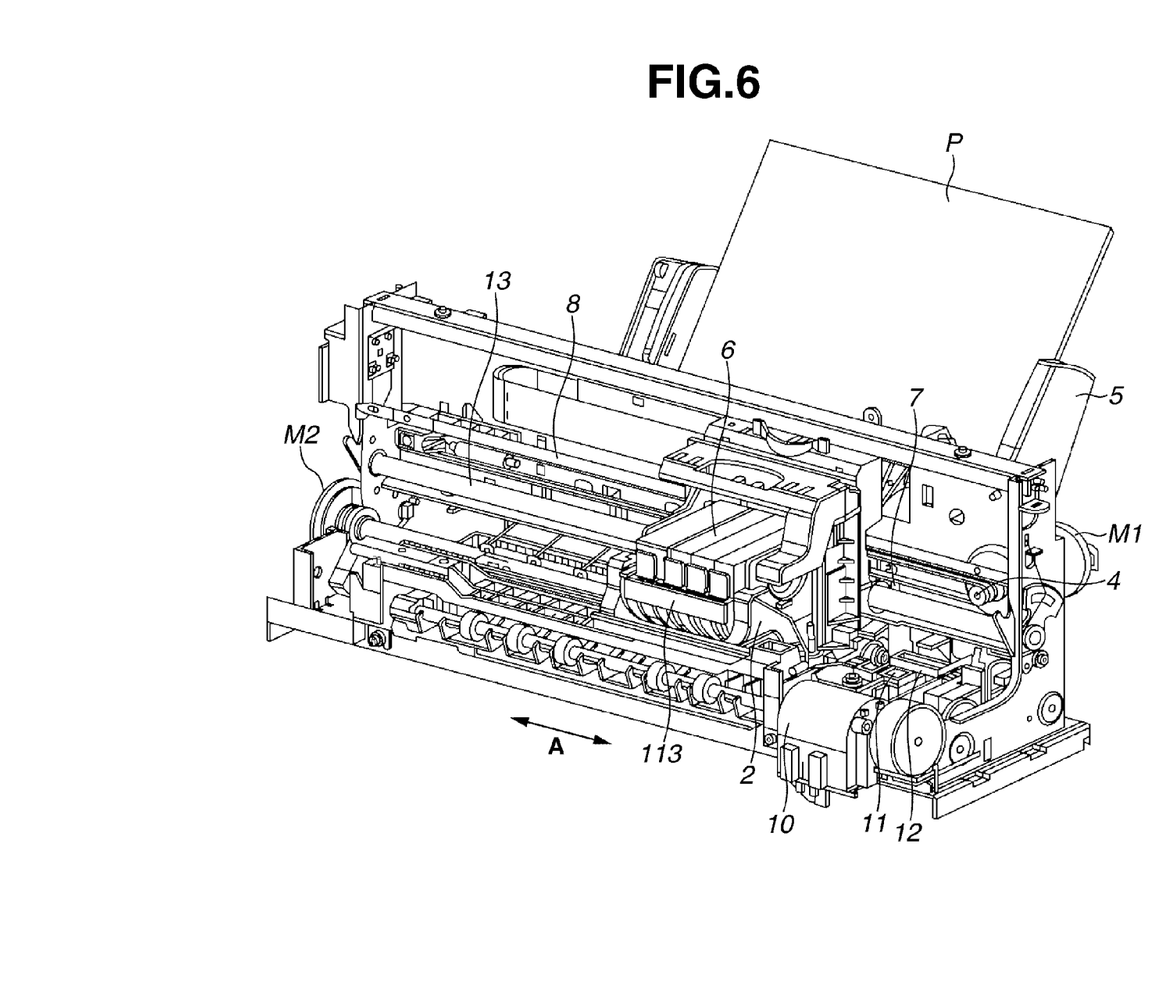
FIG. 6 illustrates a perspective view of an inkjet recording apparatus according to an exemplary embodiment of the present invention.

FIG. 6 illustrates a perspective view of an inkjet recording apparatus according to the present exemplary embodiment. As illustrated in FIG. 6, the inkjet recording apparatus (hereinafter, referred to as "recording apparatus") includes a recording head (inkjet recording head) 113 configured to discharge ink to a recording medium according to an inkjet recording method.

A carriage motor M1 generates driving force which is transmitted by a transmission mechanism 4 to a carriage 2. The carriage 2 which carries the recording head 113 can move forward and backward in a main scanning direction (a direction indicated by arrow A), so that the recording head 113 performs scanning in forward and backward directions on a recording medium P. The recording medium P (e.g., a recording paper) is supplied by a feeding mechanism 5 and conveyed to a predetermined recording position. The recording head 113 discharges ink onto the recording medium P positioned at the recording position to perform recording.

In addition to the recording head 113, the carriage 2 of the recording apparatus can carry a plurality of ink tanks 6 that store ink to be supplied to the recording head 113. Each ink tank 6 is releasably secured to the carriage 2.

The recording apparatus illustrated in FIG. 6 can perform color recording. The carriage 2 carries four ink tanks 6 of magenta (M), cyan (C), yellow (Y), and black (K) ink. Each ink tank is independently detachable from the carriage 2. The recording head 113 includes recording elements capable of discharging inks of the above-described colors. More specifically, a plurality of recording elements comprise a recording element array and the recording head 113 includes a recording element array for discharging magenta ink, a recording element array for discharging cyan ink, a recording element array for discharging yellow ink, and a recording element array for discharging black ink.

The carriage 2 and the recording head 113 have contact surfaces establishing a necessary electrical connection between them. The recording head 113 includes a plurality of discharge ports that can selectively discharge an ink droplet for recording by applying energy according to a recording signal. The recording head 113 according to the present exemplary embodiment is an inkjet type that is configured to use thermal energy to discharge ink, and includes an electrothermal converter that can generate thermal energy.

When electric energy is applied, the electrothermal converter converts electric energy into thermal energy. Thermal energy causes boiling in the ink. Pressure change due to growth and shrinkage of bubbles causes the ink to exit from the discharge port. An electrothermal converter is installed on each of the discharge ports. When a pulse voltage corresponding to a recording signal is applied to the electrothermal converter, the electrothermal converter causes a corresponding discharge port to discharge an ink droplet.

As illustrated in FIG. 6, the carriage 2 is connected to a driving belt 7 of the transmission mechanism 4 that can transmit driving force of the carriage motor M1. The carriage 2 can slidably move in the direction of the arrow A while a guide shaft 13 guides and supports the carriage 2. Accordingly, the carriage 2 moves forward and backward along the guide shaft 13 for scanning when the carriage motor M1 rotates forward and backward. A scale 8, extending in the main scanning direction of the carriage 2 (direction of arrow A), indicates a position of the carriage 2.

The recording apparatus includes a platen (not illustrated) provided at a position facing a discharge port surface (a surface on which discharge ports (not illustrated) are formed) of the recording head 113. When the carriage 2 is moved forward and backward for scanning by the driving force from the carriage motor M1, a recording signal is supplied to the recording head 113 mounted on the carriage 2 to discharge the ink in an area corresponding to an entire width of the recording medium P conveyed onto the platen to perform recording.

The recording apparatus includes a recovery device 10 provided at a position out of a forward/rearward moving range (recording region) of the recording head 113 mounted on the carriage 2. The recovery device 10 can recover the recording head 113 from defective discharge properties.

The recovery device 10 includes a capping mechanism 11 and a wiping mechanism 12. The capping mechanism 11 can cap the discharge port surface of the recording head 113. The wiping mechanism 12 cleans the discharge port surface of the recording head 113. A suction unit (e.g., a suction pump) mounted on the recovery device 10 forcibly discharges the ink from the discharge ports to completely remove residual ink and bubbles whose viscosity increased in ink passages in the recording head 113, in conjunction with capping of the discharge port surface by the capping mechanism 11.

When the recording apparatus stops the recording operation, the capping mechanism 11 caps the discharge port surface of the recording head 113 to protect the recording head 113 and to prevent ink from evaporating and drying. The wiping mechanism 12 which is positioned near the capping mechanism 11 wipes out the ink droplets adhering to the discharge port surface of the recording head 113.

The recording apparatus can preliminarily discharge non-record-related ink to the capping mechanism 11 before performing recording. The capping mechanism 11 realizing a suction operation and a preliminary discharge operation and the wiping mechanism 12 realizing a wiper operation can maintain the recording head 113 in a normal ink discharge state.

Figure 7:
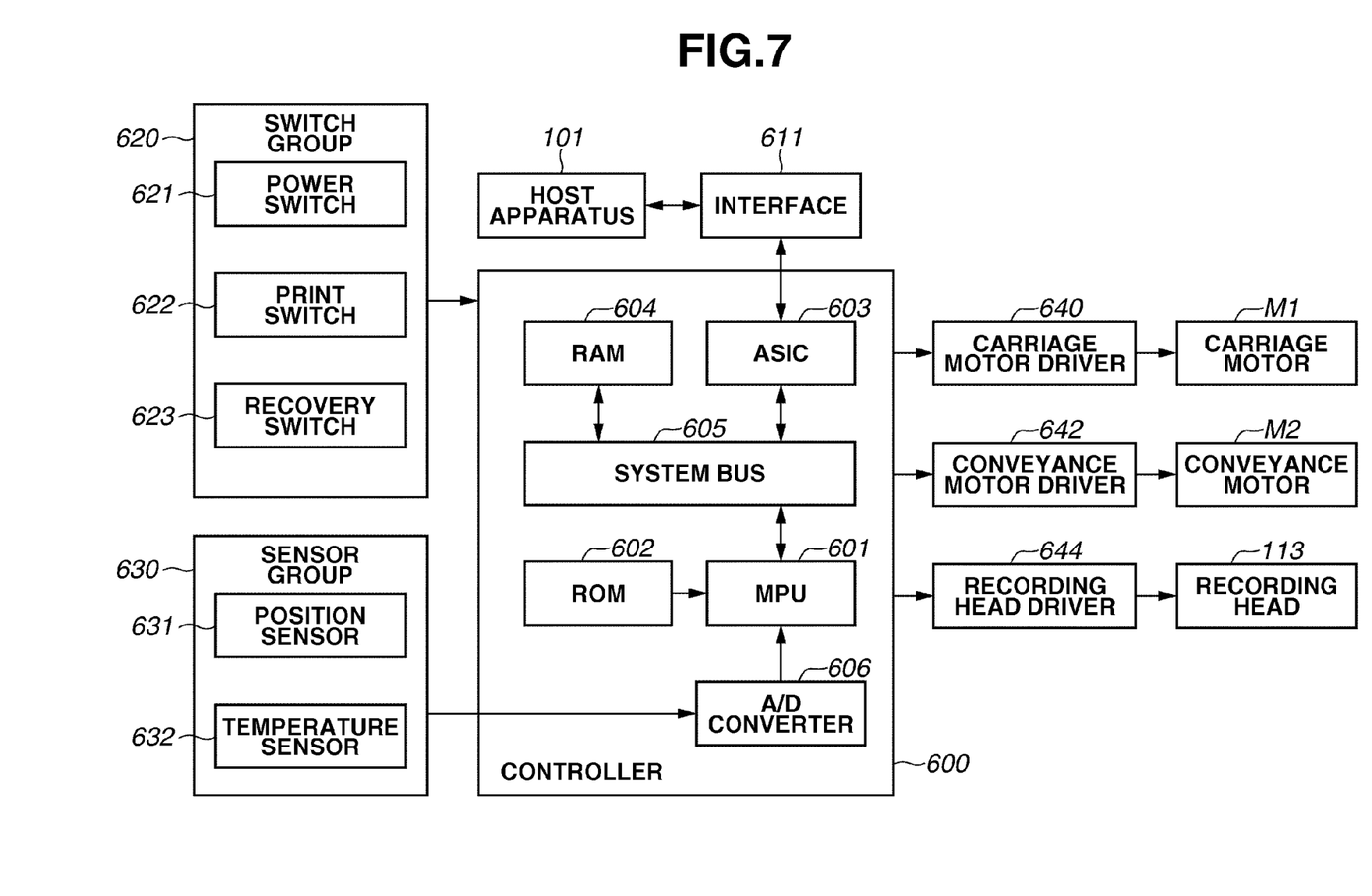
FIG. 7 is a block diagram illustrating an example of a control configuration for the recording apparatus illustrated in FIG. 6.

FIG. 6 illustrates the ink tanks 6 separable from the recording head 113. However, the recording apparatus can use a head cartridge integrating ink tanks with a recording head. FIG. 7 is a block diagram illustrating an example of a control configuration of the recording apparatus illustrated in FIG. 6.

As illustrated in FIG. 7, a controller 600 includes a micro processing unit (MPU) 601, a read-only memory (ROM) 602, an application specific integrated circuit (ASIC) 603, a random access memory (RAM) 604, a system bus 605, and an analog-to-digital (A/D) converter 606. The ROM 602 stores necessary tables and fixed data. The ASIC 603 generates control signals for controlling the carriage motor M1, a conveyance motor M2, and the recording head 113. The RAM 604 can be used as a rasterizing area of image data or a work area when the MPU 601 executes programs. The system bus 605 connects the MPU 601, the ASIC 603, and the RAM 604 and enables them to mutually transmit/receive data. The A/D converter 606 performs A/D conversion on analog signals received from a sensor group and supplies converted signals (digital signals) to the MPU 601.

Figure 1:
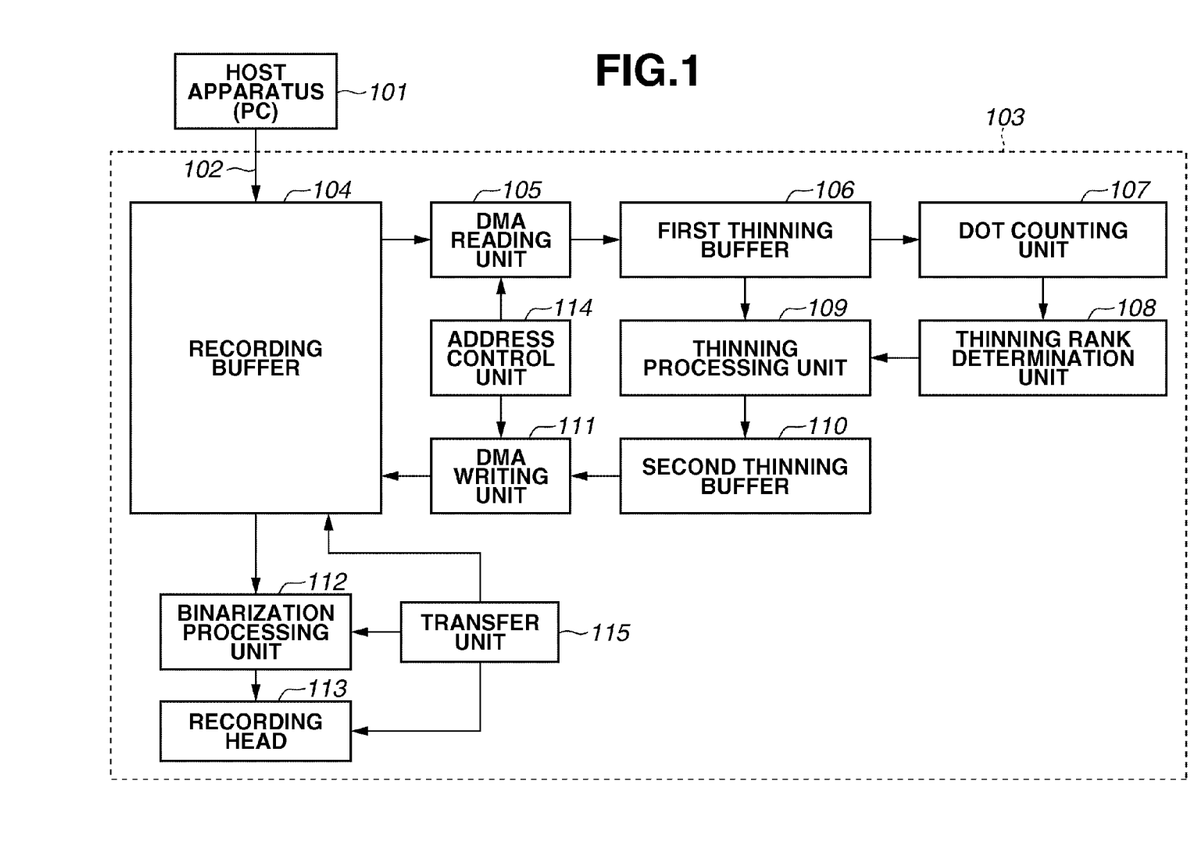
FIG. 1 is a block diagram illustrating an example of a configuration capable of performing thinning processing according to an embodiment of the present invention.

For example as illustrated in FIG. 1, the ASIC 603 includes a direct memory access (DMA) reading unit 105, a direct memory access (DMA) writing unit 111, a thinning processing unit 109, a first thinning buffer 106, a second thinning buffer 110, an ink amount evaluation unit (dot counting unit) 107, a thinning rank determination unit 108, and a binarization processing unit 112. The binarization processing unit 112 is provided in a transfer unit (not illustrated), which transfers binary data to the recording head 113.

A host apparatus 101 is a computer functioning as a data source capable of supplying image data. The host apparatus 101 and the recording apparatus can mutually transmit and receive image data, commands, and status signals via an interface (I/F) 611. A switch group 620 includes a power switch 621, a print switch 622, and a recovery switch 623. The print switch 622 enables a user to instruct the recording apparatus to perform print processing. The recovery switch 623 enables a user to instruct the recording apparatus to perform a recovery operation.

A sensor group 630 includes a position sensor 631 and a temperature sensor 632. The position sensor 631 is, for example, a photocoupler capable of detecting a home position. The temperature sensor 632 is provided at an appropriate position of the recording apparatus to detect ambient temperature.

A carriage motor driver 640 drives the carriage motor M1. A conveyance motor driver 642 drives the conveyance motor M2. A recording head driver 644 drives the recording head 113. In the present exemplary embodiment, a switching-type direct-current (DC) voltage conversion circuit is usable as the recording head driver 644 that supplies driving voltage to the recording head 113. The switching-type DC voltage conversion circuit is also usable as the conveyance motor driver 642 that supplies electric power to the conveyance motor M2.

FIG. 1 is a block diagram illustrating an example of a configuration capable of performing data processing according to the present exemplary embodiment of the present invention. The host apparatus (personal computer (PC)) 101 transfers multi-valued index data to a recording apparatus 103 via an interface cable 102. A recording buffer 104 stores index data received from the host apparatus 101. The index data stored in the recording buffer 104 can be transferred to the binarization processing unit 112. In this case, index data corresponding to a boundary portion between two consecutive bands on the recording medium P is subjected to thinning processing before the index data is transferred from the recording buffer 104 to the binarization processing unit 112. One band is a region recordable by a single scanning operation.

The binarization processing unit 112 converts multi-valued index data into binary data. For example, the binarization processing unit 112 converts index data of one pixel into binary data of four dots. The arrangement of four dots is, for example, two dots in the scanning direction and two dots in the conveyance direction. Accordingly, in this case, the binarization processing unit 112 generates binary data of two rasters from index data of one raster. The recording head 113 performs recording based on binary data transferred from the binarization processing unit 112. The binarization processing unit is an example of a quantization means.

The following is an example of thinning processing. The DMA reading unit 105 reads data from a region near a boundary portion between image regions recorded by different scanning operations on the recording buffer 104, and stores the read data in the first thinning buffer 106. When the first thinning buffer 106 completely stores data of each color, the ink amount evaluation unit (dot counting unit) 107 evaluates an ink amount (data amount) of density data. Namely, the ink amount evaluation unit 107 evaluates the amount of recorded ink (number of dots). The ink amount evaluation unit 107 performs the above-described evaluation while converting density data into granularities.

In other words, the ink amount evaluation unit 107 evaluates a data amount corresponding to the number of dots of ink. Accordingly, the ink amount evaluation unit 107 can be referred to as "data amount evaluation unit." More specifically, the ink amount evaluation unit (dot counting unit) 107 counts the number of dots referring to the density data and evaluates the ink amount based on a count value. The ink amount evaluation unit 107 outputs a dot count value of each color based on a count result. The thinning rank determination unit 108 determines a thinning rank of each color with reference to magnitude correlation of the dot count value of each color received from the ink amount evaluation unit 107.

In this manner, the thinning rank determination unit 108 sets a thinning amount differentiated for each color based on the dot count value. After completing the thinning rank determination processing, the thinning processing unit 109 executes the thinning processing. After completing the thinning processing, the second thinning buffer 110 stores thinned-out data. The DMA writing unit 111 reads the thinned-out data from the second thinning buffer 110 and sends the thinned-out data to the recording buffer 104. In other words, the multi-valued data stored in the recording buffer 104 is partly rewritten into the thinned-out data.

To perform the above-described processing, the ASIC 603 includes an address control unit 114 configured to hold information about an address of the read recording buffer 104 and a read region and perform a register control. The address control unit 114 performs address management for the DMA reading unit 105 and the DMA writing unit 111. The address control unit 114 performs the address management based on information about a number of bits expressed by image data.

The DMA writing unit 111 performs writing with reference to the information about the read address and the read region. A transfer unit 115 transfers the index data stored in the recording buffer 104 to the binarization processing unit (data conversion unit) 112.

Figure 2A:
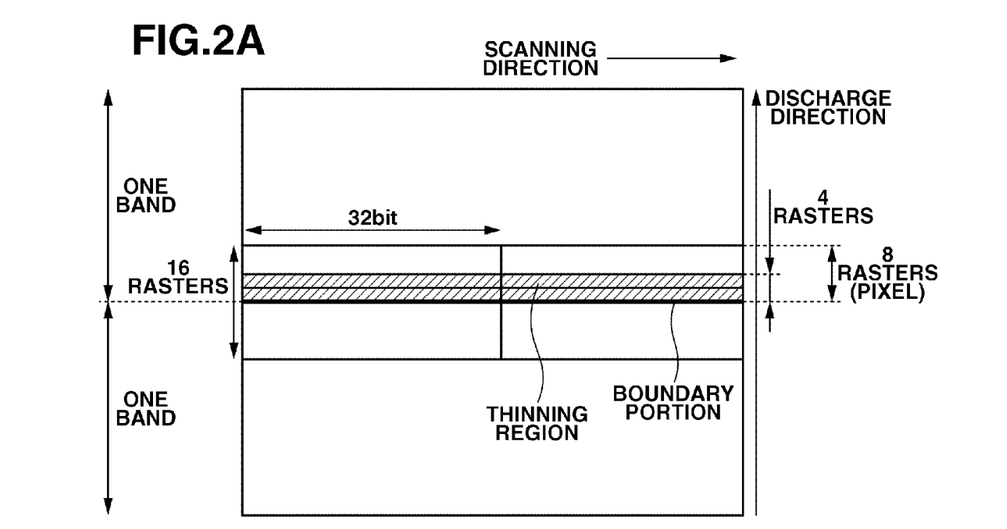
FIGS. 2A to 2C illustrate examples of image data stored in a recording buffer.

FIG. 2A illustrates an example of the image data stored in the recording buffer 104. A storage state of the image data in the recording buffer 104 corresponds to a scanning region on the recording medium. According to the example illustrated in FIG. 2A, image data corresponding to two scanning operations is stored per scanning operation. The recording buffer 104 stores the index data. A hatched region indicates a thinning processing target region which stores image data to be thinned out.

The boundary portion is a boundary of memory regions corresponding to the boundary between two consecutive bands on the recording medium. Image data of 16 rasters arrayed in the conveyance direction which includes the boundary portion is a target from which below-described data amount is acquired. For example, the data amount is acquired by counting dots based on the index data. A memory region storing target image data from which the data amount is acquired is referred to as "dot count region." As illustrated in FIG. 2A, two or more divided dot count regions are arranged in the scanning direction. A size of each dot count region is 32 bits (bit) in the scanning direction and 16 rasters in the discharge direction. The image data is read from each dot count region.

Figure 2B:
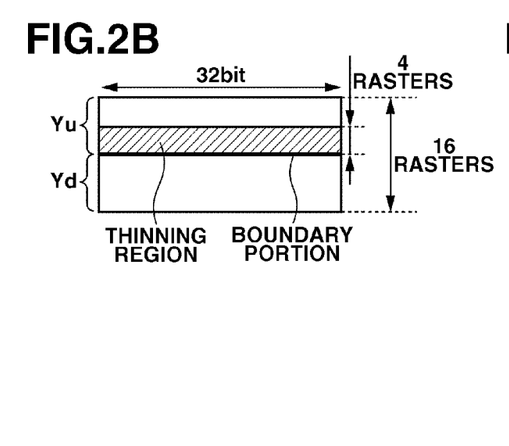
Figure 2C:
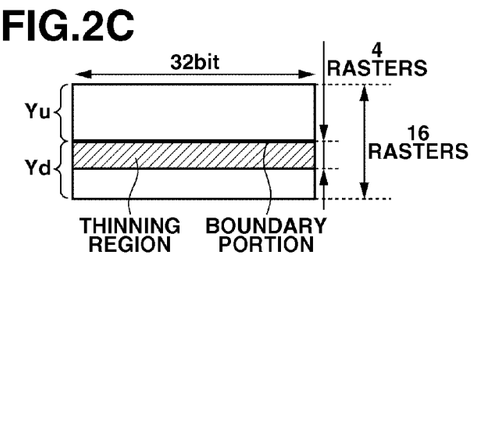

FIGS. 2B and 2C illustrate a dot count region and a thinning region of yellow (Y) illustrated in FIG. 2A. The dot count region includes a plurality of divided regions. To simplify the description, the dot count region illustrated in FIG. 2B or 2C includes regions Yu and Yd. For example, the region Yu stores data for the preceding (first) scanning/recording operation. The region Yd stores data for the following (subsequent) scanning/recording operation.

The dot count region includes a plurality of regions divided in the conveyance direction (alignment direction of the recording elements). In other words, the image data stored in the dot count region is divided into a plurality of groups in the conveyance direction (alignment direction of the recording elements). FIG. 2B illustrates the thinning region included in the region Yu. FIG. 2C illustrates the thinning region included in the region Yd. In FIGS. 2B and 2C, the thinning region has a vertical width equivalent to four rasters. Each of the region Yu and the region Yd has a vertical width equivalent to eight rasters.

More specifically, in the dot count region illustrated FIG. 2B, the thinning region is positioned on the downstream side of the boundary portion in the discharge direction. In FIG. 2C, the thinning region is positioned on the upstream side of the boundary portion in the discharge direction. Allocation of the thinning region is, for example, determined according to a recording mode. Similar to the dot count region of yellow (Y), a dot count region of cyan (C) is divided into regions Cu and Cd. A dot count region of magenta (M) is divided into regions Mu and Md.

In short, as illustrated in FIGS. 2A, 2B, and 2C, a part of the image data (i.e., image data having a predetermined raster width consecutive in the conveyance direction) stored in the recording buffer 104 is read and dot counting is performed on this image data. Further, the thinning processing is performed on apart of the read image data including a plurality of rasters (i.e., image data having the predetermined raster width consecutive in the conveyance direction) as thinning target image data. Therefore, the present exemplary embodiment includes a selection unit configured to select target image data to be subjected to thinning processing.

As illustrated in FIG. 2A, a rectangular block of index data having a size of 64 bytes (16 rasters×32 bits) and straddling the boundary portion is referred to as "image data near the boundary portion." The first thinning buffer 106 stores the image data near the boundary portion for each color. When each color requires 64 bytes, a memory capacity required for the first thinning buffer 106 is 192 bytes (64 bytes×three colors of Y, M, and C). In the present exemplary embodiment, the thinning region of four rasters (the hatched region in FIGS. 2A to 2C) is divided into two regions to which the thinning processing is applied differently.

Figure 3:
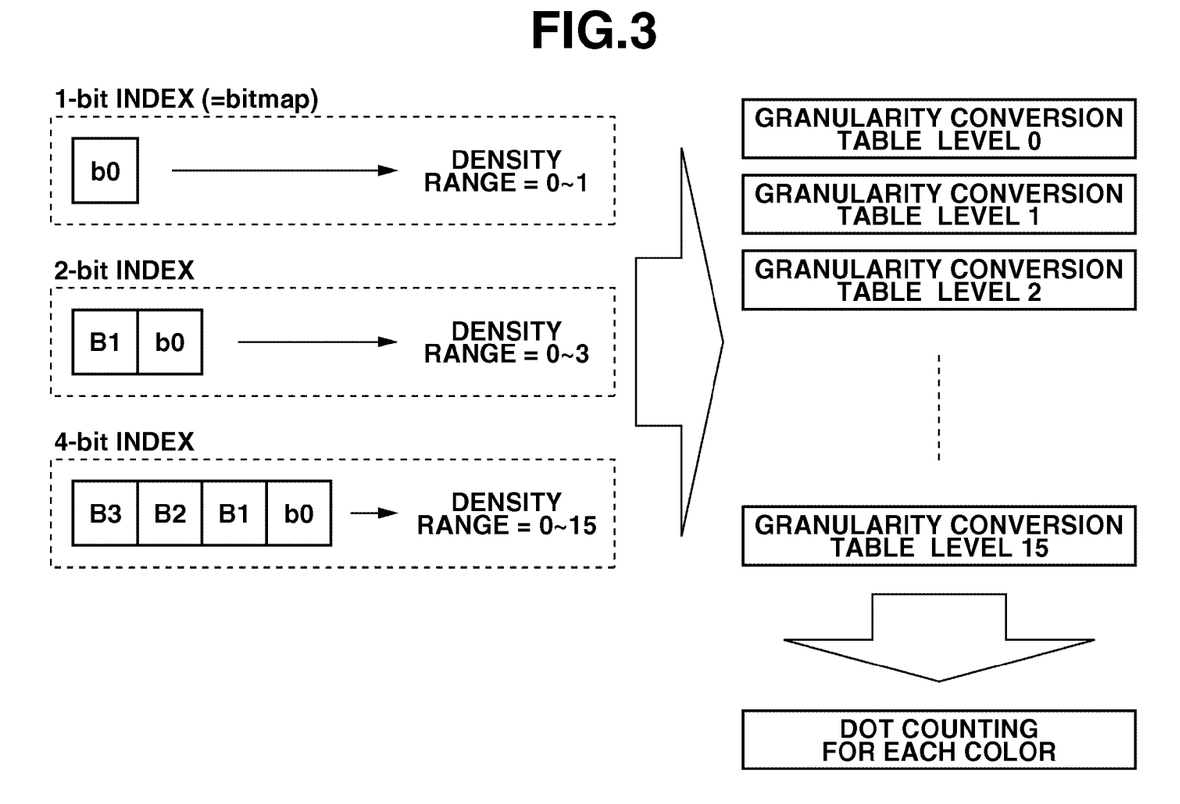
FIG. 3 illustrates an example of a dot counting procedure including granularity conversion of index data.

FIG. 3 illustrates an example of dot counting including conversion of the index data into granularities. The index data is density information expressed by a plurality of bits, such as one-bit, two-bit, or four-bit density.

A number of bits is set for each recording mode (operation mode) of the recording apparatus. For example, the recording apparatus is operable in a recording mode using one-bit index data (i.e., binary data), a recording mode using two-bit index data, or a recording mode using four-bit index data. The two-bit index data can realize four gradations. The four-bit index data can realize 16 gradations. Granularity conversion tables illustrated in FIG. 3 have registers. Fixed values (density data) corresponding to each mode can be set in these registers, so that these registers can be commonly used for respective recording modes.

More specifically, the 1-bit index data takes 0 or 1 and substantially indicates only the presence of data. In this respect, the 1-bit index data is equivalent to bitmap data. In other words, if the above-described thinning processing is applied to the bitmap data, the bitmap data can be regarded as the 1-bit index data and therefore a common circuit is usable. If the 1-bit index data is 0, dot counting is performed by referring to a granularity conversion table level 0. If the 1-bit index data is 1, the dot counting is performed by referring to a granularity conversion table level 1.

The value range expressible with the two-bit index data is 0 to 3, and the dot counting is performed by referring to respective granularity conversion table levels 0 to 3. The value range expressible with the four-bit index data is 0 to 15, and the dot counting is performed by referring to respectively corresponding granularity conversion table levels 0 to 15.

The present exemplary embodiment prepares granularity conversion tables for Y, M, and C colors. To perform granularity conversion of Y, M, and C, table values on the respective Y, M, and C granularity conversion tables are referred to for performing dot counting.

FIGS. 4A to 4I illustrate an example of processing for determining thinning ranks based on magnitude correlation of dot count values of respective colors obtained by the ink amount evaluation unit 107. First, the ink amount evaluation unit 107 performs the dot counting on Y, M, and C data near the above-described boundary portion to obtain count values Dy, Dm, and Dc (see FIG. 4A). Dt represents a sum of the count values Dy, Dm, and Dc.

Figure 4A:
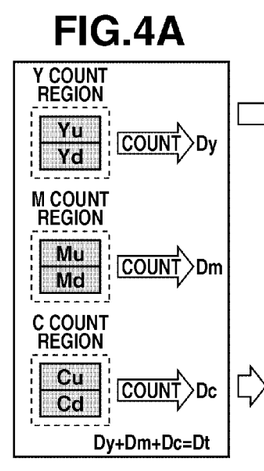
FIGS. 4A to 4I illustrate an example of processing for determining thinning ranks based on magnitude correlation of dot count values of respective colors obtained by a dot counting unit.

In FIG. 4A, the dot count region of each color is divided into two similar regions along the boundary portion, as described with reference to FIGS. 2B and 2C. More specifically, the dot count region of yellow includes regions Yu and Yd. The dot count region of magenta includes regions Mu and Md. The dot count region of cyan includes regions of Cu and Cd.

Figures 4B, 4C, 4D, 4E, 4F, 4G:
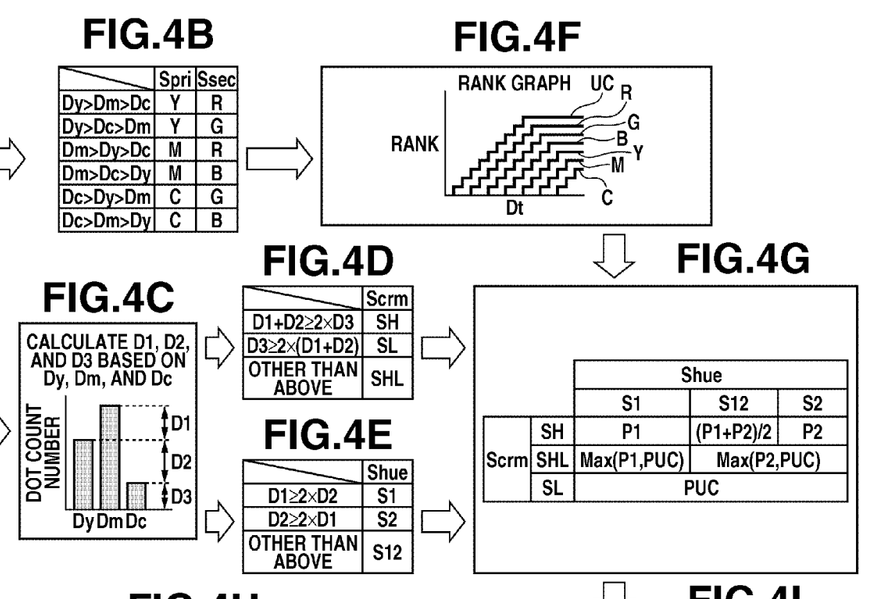

The processing includes evaluating count values Dy, Dm, and Dc with reference to a table illustrated in FIG. 4B and identifying a primary color (Spri) and a secondary color (5 sec) represented by the data near the boundary portion. For example, if a relationship Dy>Dm>Dc is satisfied in FIG. 4B, the primary color (Spri) is Y and the secondary color (5 sec) is R. Dmax represents a maximum one among Dy, Dm, and Dc. Dmin represents a minimum one among Dy, Dm, and Dc. Dmid represents a mid one among Dy, Dm, and Dc. The processing includes calculating D1 (=Dmax−Dmid), D2 (=Dmid−Dmin), and D3 (=Dmin) (see FIG. 4C). The processing further includes determining values of chroma (Scrm) and hue (Shue) based on the magnitude correlation of D1, D2, and D3. The chroma is set to SH if $D1+D2 \geqq 2 \times D3$ is satisfied, to SL if $D3 \geqq 2 \times (D1+D2)$ is satisfied, and otherwise is set to SHL (see FIG. 4D). The hue is set to S1 if $D1 \geqq 2 \times D2$ is satisfied, to S2 if $D2 \geqq 2 \times D1$ is satisfied, and otherwise is set to S12 (see FIG. 4E).

Next, a primary color rank (P1), a secondary color rank (P2), and a tertiary color rank (PUC) are obtained by referring to rank graphs of Y, M, C, R, G, B, and under color (UC: tertiary color) prepared beforehand for each of the above-described Yu, Yd, Mu, Md, Cu, and Cd regions. More specifically, the rank for each above-described region is obtained from the value of Dt with reference to the rank graphs of the primary color and the secondary color determined according to the table illustrated in FIG. 4B and the rank graph of UC, among the rank graphs of Y, M, C, R, G, B, and UC illustrated in FIG. 4F.

A thinning rank which indicates the degree of thinning processing is determined based on the above-described Scrm, Shue, P1, P2, and PUC, for example, with reference to a thinning rank table illustrated in FIG. 4G.

The present exemplary embodiment performs the thinning processing on every two rasters of a region having a width equivalent to four rasters positioned on the boundary portion side, in respective Yu, Mu, and Cu regions, with a common mask pattern. The thinning processing includes determining the thinning rank for every two rasters in the region having a width equivalent to four rasters on the boundary portion side in respective Yu, Mu, and Cu regions.

Figure 4H:
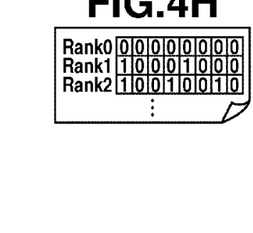
Figure 4I:
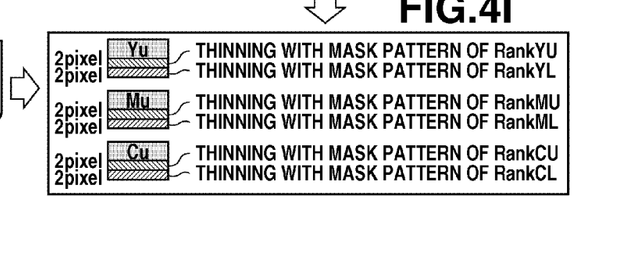

As illustrated in FIG. 4I, RankYU is a thinning rank for an upper two-raster zone of the Yu region and RankYL is a thinning rank for a lower two-raster zone of the Yu region of yellow. Similarly, RankMU is a thinning rank for an upper two-raster zone of the Mu region and RankML is a thinning rank for a lower two-raster zone of the Mu region of magenta. RankCU is a thinning rank for an upper two-raster zone of the Cu region and RankCL is a thinning rank for a lower two-raster zone of the Cu region of cyan.

The present exemplary embodiment uses a plurality of mask patterns which are different in mask rate and prepared beforehand for each of the thinning ranks (see FIG. 4H). As illustrated in FIG. 4I, the thinning processing is performed on each of the above-described two-raster zones with a mask pattern corresponding to a determined rank. The thinning rate becomes larger when the rank value increases. As described with reference to FIGS. 2A to 2C, the present exemplary embodiment performs the thinning processing on four consecutive rasters selected from 16-raster data. In performing the thinning processing, the present exemplary embodiment divides the four-raster image data into two groups and performs thinning processing on the image data of two groups with different thinning rates.

As described above, in the thinning processing according to the present exemplary embodiment, the image data including the boundary portion between two scanning operations which is stored in the recording buffer 104 is read by an amount corresponding to a predetermined number of consecutive rasters arrayed in the conveyance direction. The thinning target image data is selected from the read image data and divided into a plurality of groups. Then the thinning processing is performed on respective groups with different thinning rates.

Figure 5:
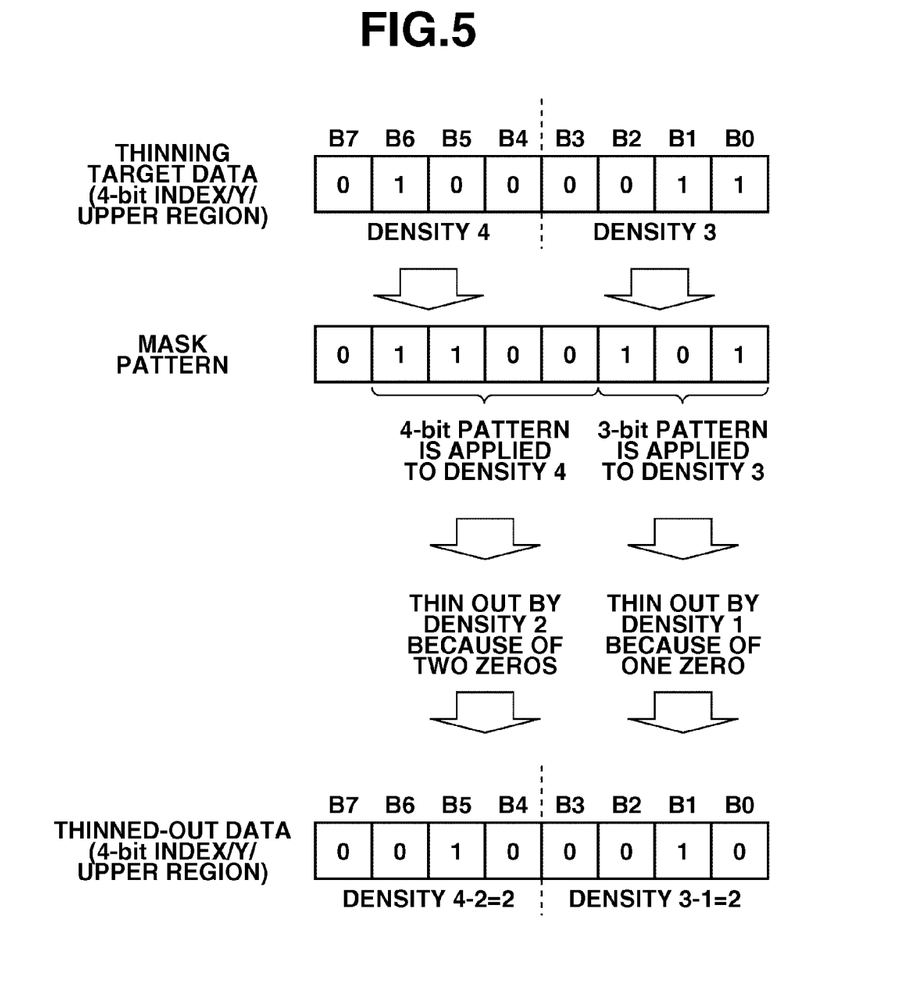
FIG. 5 illustrates an example of a method for thinning out index data with a thinning pattern corresponding to a rank determined in each region.

FIG. 5 illustrates an example of a method for thinning out the index data with a thinning pattern corresponding to the rank determined in each region. As an example, the thinning-out method is applied to 8-bit data of an upper region above the boundary portion of a thinning target region of Y. The data is four-bit index data. The thinning target data includes an upper four-bit data (B4 to B7) representing "density 4" and a lower four-bit data (B0 to B3) representing "density 3." The thinning processing is performed on the thinning target data with the thinning pattern illustrated in FIG. 5.

When the lower four bits of the thinning target data represent "density 3", it means that there are three-bit dots if the thinning target data is converted into bitmap data. The thinning processing according to the present exemplary embodiment is sequential multi scanning (SMS) mask processing. The SMS mask processing reads a count value of a predetermined number of bits from a mask pattern corresponding to recorded data, thins out the recorded data if the count value is 0, and on the other hand, does not thin out the recorded data if the count value is 1. Then the SMS mask processing shifts a position (bit position) of the count value read from the mask pattern according to the recorded data, returns to the position of the initially read count value if the shift position exceeds the number of bits constituting the mask pattern, and cyclically reads the count values. The SMS mask processing is processing for thinning out the recorded data by repeating the above-described processing.

The present exemplary embodiment uses three bits from a least significant bit (LSB) side of the mask pattern (right side of FIG. 5) for the above-described three-bit dots. The three bits of the LSB of the mask pattern illustrated in FIG. 5 include one zero (0) as a bit to be thinned out. Therefore, "thinned-out data" illustrated in FIG. 5 includes a lower four-bit data representing "density 2", which is obtained by subtracting "density 1" from "density 3."

The upper four bits of the thinning target data represents "density 4." Four bits next to the above-described three bits of the LSB of the mask pattern includes two zeros. Therefore, the "thinned-out data" illustrated in FIG. 5 includes an upper four-bit data representing "density 2", which is obtained by subtracting "density 2" from "density 4."

By repeating the above-described processing, the present exemplary embodiment can perform processing equivalent to the SMS mask processing which is conventionally performed on bitmap data on the index data. Further, the present exemplary embodiment can save the memory capacity of the recording buffer 104 because all of the data stored in the recording buffer 104 can be processed as the index data. Furthermore, as the bitmap data can be regarded as one-bit index data, the thinning processing can be similarly performed on the boundary portion regardless of the data (e.g., index data or bitmap data) transferred from the host apparatus 101.

Figure 8:
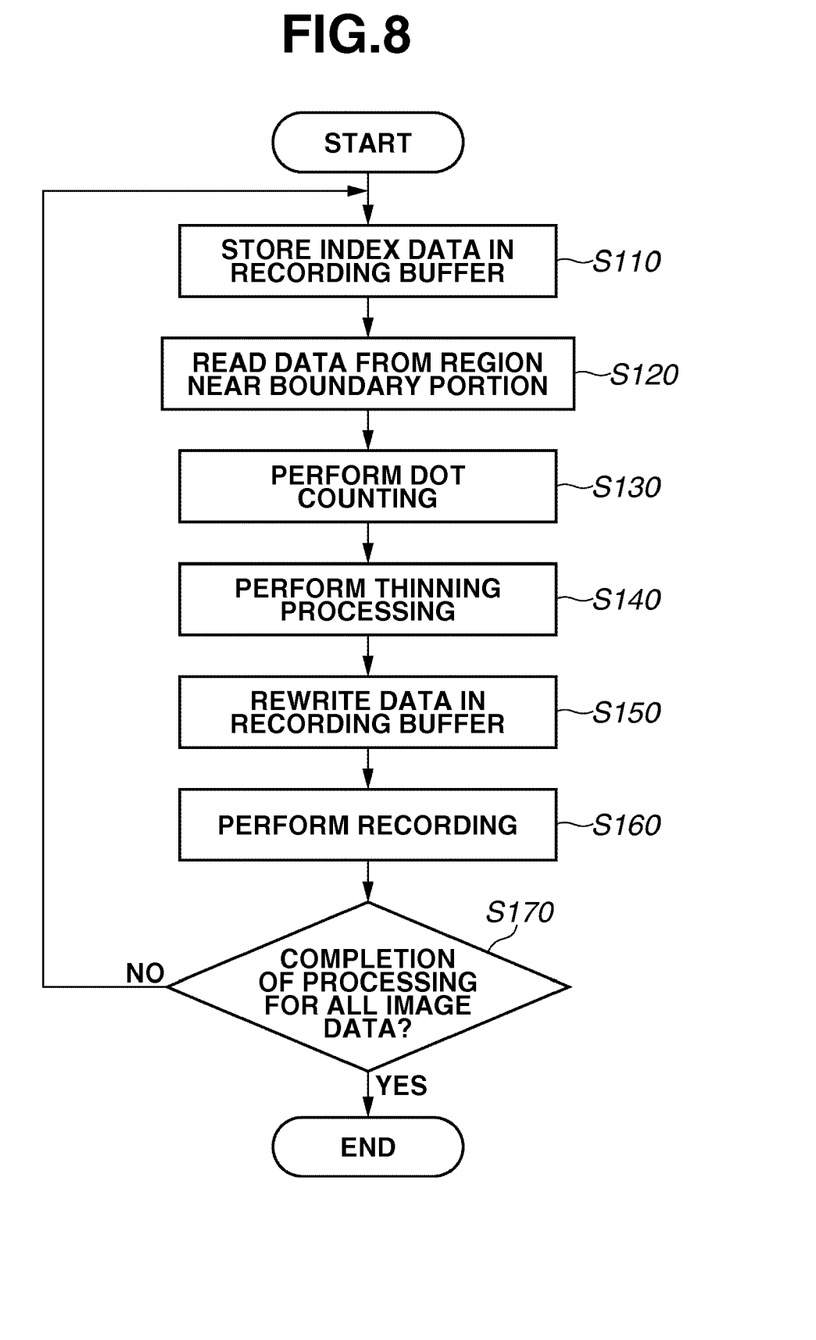
FIG. 8 is a flowchart illustrating an example of a recording method according to an embodiment of the present invention.

FIG. 8 is a flowchart illustrating an example of a recording method according to the present exemplary embodiment of the present invention. In step S110, the controller 600 causes the recording buffer 104 to store index data received from the host apparatus 101. In step S120, the controller 600 reads data from a region near the boundary portion. In step S130, the controller 600 performs dot counting based on the data read from the region near the boundary portion. In step S140, the controller 600 performs thinning processing on the data in the region near the boundary portion based on the count value obtained by the dot counting. In step S150, the controller 600 rewrites the thinned-out data in the region near the boundary portion to the recording buffer 104. In step S160, the controller 600 performs recording based on the rewritten index data stored in the recording buffer 104. In step S170, the controller 600 determines whether the processing of steps S110 to S170 has been completed for all image data.

While the present invention has been described with reference to the exemplary embodiment, it is to be understood that the invention is not limited to the disclosed exemplary embodiment. The scope of the following claims is to be accorded the broadest interpretation so as to encompass all modifications, equivalent structures, and functions.

What is claimed is:

1. A recording apparatus for effecting recording on a recording medium by scanning a recording head for discharging plural colors of inks with respect to the recording medium, the recording apparatus comprising:
   an obtaining unit configured to obtain information on a relative relation between amounts of inks of the plural colors to be discharged for each of plural unit areas based on M-valued data corresponding to each of the plural colors of inks with respect to each of the plural unit areas, the unit areas being provided by dividing an area in a neighborhood of a boundary between adjacent bands recorded on the recording medium by scanning of the recording head;
   a determining unit configured to determine, for each of plural colors of inks, a reduction rate for reducing a value of the M-valued data corresponding to each of the plural colors of inks corresponding to a predetermined area within the unit area based on the information on the relative relation obtained by the obtaining unit and based on information on a total ink amount of the plural colors of inks;
   a reducing unit configured to reduce the value of the M-valued data corresponding to each of the plural colors of inks corresponding to the predetermined area based on the reduction rate for each of the plural colors of inks determined by the determining unit; and
   a converting unit configured to convert the M-valued data of which the value was reduced by the reducing unit corresponding to each of the plural colors of inks into N-valued data, M being greater than or equal to N, corresponding to each of the plural colors of inks for discharging each of the plural colors of inks by the recording head.

2. The recording apparatus according to claim 1, wherein the information on the ink amount is information on a number of dots of inks discharged from the recording head.

3. The recording apparatus according to claim 1, wherein the reducing unit reduces the value of the M-valued data corresponding to each of the plural colors of inks by using a conversion pattern determined for each of the reduction rates.

4. The recording apparatus according to claim 1, wherein the determining unit determines chroma and hue for each of the unit areas based on the information on the relative relation between the amounts of the plural colors of inks discharged for each of the unit areas and determines the reduction rate based on the determined chroma and hue for each of the unit areas, and based on the information on the total amount of the plural colors of inks.

5. The recording apparatus according to claim 1, wherein the predetermined area includes a first area and a second area, and wherein the determining unit differentiates the reduction rate in the first area from the reduction rate in the second area.

6. The recording apparatus according to claim 1, wherein the converting unit converts the M-valued data corresponding to each of the plural colors of inks, the value of which was reduced by the reducing unit by using an index pattern, into binary data of each of the plural colors of inks.

7. The recording apparatus according to claim 1, wherein the predetermined area is smaller than the unit area.

8. The recording apparatus according to claim 1, wherein the plural colors of inks are inks of cyan, magenta and yellow.

9. A recording method for effecting recording on a recording medium by scanning a recording head for discharging plural colors of inks with respect to the recording medium, the recording method comprising:
  obtaining information on a relative relation between amounts of inks of the plural colors to be discharged for each of plural unit areas based on M-valued data corresponding to each of the plural colors of inks with respect to each of the plural unit areas, the unit areas being provided by dividing an area in a neighborhood of a boundary between adjacent bands recorded on the recording medium by scanning of the recording head;
  determining, for each of plural colors of inks, a reduction rate for reducing a value of the M-valued data corresponding to each of the plural colors of inks corresponding to a predetermined area within the unit area based on the obtained information on the relative relation and based on information on a total ink amount of the plural colors of inks;
  reducing the value of the M-valued data corresponding to each of the plural colors of inks corresponding to the predetermined area based on the determined reduction rate for each of the plural colors of inks; and
  converting the M-valued data of which the value was reduced corresponding to each of the plural colors of inks into N-valued data, M being greater than or equal to N, corresponding to each of the plural colors of inks for discharging each of the plural colors of inks by the recording head.

10. The recording method according to claim 9, wherein the information on the ink amount is information on a number of dots of inks discharged from the recording head.

11. The recording method according to claim 9, wherein the value of the M-valued data corresponding to each of the plural colors of inks is reduced by using a conversion pattern determined for each of the reduction rates.

12. The recording method according to claim 9, further comprising determining chroma and hue for each of the unit areas are determined based on the information on the relative relation between the amounts of the plural colors of inks discharged for each of the unit areas, wherein the reduction rate is determined based on the determined chroma and hue for each of the unit areas and based on the information on the total amount of the plural colors of inks.

13. The recording method according to claim 9, wherein the predetermined area includes a first area and a second area, and wherein the reduction rate in the first area is differentiated from the reduction rate in the second area.

14. The recording method according to claim 9, wherein the M-valued data corresponding to each of the plural colors of inks, the value of which was reduced by using an index pattern, is converted into binary data of each of the plural colors of inks.

15. The recording method according to claim 9, wherein the predetermined area is smaller than the unit area.

16. The recording method according to claim 9, wherein the plural colors of inks are inks of cyan, magenta and yellow.

17. A non-transitory computer-readable storage medium that stores a computer program for processing multi-valued data used for effecting recording on a recording medium by scanning a recording head for discharging plural colors of inks with respect to the recording medium, the program comprising:
  obtaining information on a relative relation between amounts of inks of the plural colors to be discharged for each of plural unit areas based on M-valued data corresponding to each of the plural colors of inks with respect to each of the plural unit areas, the unit areas being provided by dividing an area in a neighborhood of a boundary between adjacent bands recorded on the recording medium by scanning of the recording head;
  determining, for each of plural colors of inks, a reduction rate for reducing a value of the M-valued data corresponding to each of the plural colors of inks corresponding to a predetermined area within the unit area based on the obtained information on the relative relation and based on information on a total ink amount of the plural colors of inks;
  reducing the value of the M-valued data corresponding to each of the plural colors of inks corresponding to the predetermined area based on the determined reduction rate for each of the plural colors of inks; and
  converting the M-valued data of which the value was reduced corresponding to each of the plural colors of inks into N-valued data, M being greater than or equal to N, corresponding to each of the plural colors of inks for discharging each of the plural colors of inks by the recording head.

* * * * *